United States Patent [19]

Illakowicz

[11] Patent Number: 4,822,221

[45] Date of Patent: Apr. 18, 1989

[54] INTERNAL FLASH REMOVAL UNIT

[75] Inventor: Jan Illakowicz, New Orleans, La.

[73] Assignee: McDermott Incorporated, New Orleans, La.

[21] Appl. No.: 61,614

[22] Filed: Jun. 15, 1987

[51] Int. Cl.⁴ .............................................. B23D 3/02
[52] U.S. Cl. ...................................... 409/309; 82/1.2; 409/299; 409/313
[58] Field of Search ............... 409/295, 297, 298, 299, 409/300, 303, 304, 307, 309, 310, 313, 305; 29/33 A; 408/81, 82, 83; 82/1.2, 82

[56] References Cited

U.S. PATENT DOCUMENTS

| 1,907,588 | 5/1933 | Rupp | 409/309 |
|---|---|---|---|
| 2,237,550 | 4/1941 | Darner | 409/299 |
| 3,103,834 | 9/1963 | Neukom | 409/299 |
| 3,293,963 | 12/1966 | Carroll et al. | 82/82 |
| 3,859,877 | 1/1975 | Sherer et al. | 82/82 |
| 4,084,484 | 4/1978 | Shklyanov et al. | 82/1.2 |
| 4,383,786 | 5/1983 | Paton et al. | 409/299 |
| 4,396,323 | 8/1983 | Theurer | 409/298 |
| 4,610,586 | 9/1986 | Langeder | 409/300 |
| 4,682,921 | 7/1987 | Blaho | 409/299 |

FOREIGN PATENT DOCUMENTS 821792 10/1951 Fed. Rep. of Germany ...... 409/309

Primary Examiner—Gil Weidenfeld
Assistant Examiner—Daniel W. Howell
Attorney, Agent, or Firm—Robert J. Edwards; D. Neil LaHaye

[57] ABSTRACT

An internal flash removal unit which radially cuts flash while it is still hot and relatively soft. A drive motor and reduction gearbox mounted in a housing drive a tooling plate rotatably mounted on the housing. A cutting assembly is mounted on an arm which is pivotally mounted on the tooling plate. A hydraulic actuator causes the arm to move outward and place the cutting assembly into cutting position as rotation of the tooling plate begins.

10 Claims, 2 Drawing Sheets

INTERNAL FLASH REMOVAL UNIT

BACKGROUND OF THE INVENTION

1. Field of the Invention

The present invention generally relates to welding equipment and in particular to equipment for removing the internal flash from pipe ends which have been welded together.

2. General Background

In laying continuous pipeline on land or offshore, a common method of welding the pipe sections together is by flash butt welding. In this type of operation the pipe sections are clamped together end-to-end and heated electrically by electrical contact shoes. As the temperature of each pipe end increases and reaches forging temperature, the pipe ends are forced together to expel molten metal and undesirable oxides and forge the two pipe ends together. This results in a considerable amount of slag or flash at the joint on the inner and outer surfaces of the pipe since the movement of the pipe sections toward each other may be two inches or more. Removal of the flash is necessary to facilitate application of a protective coating to the outside of the pipe, and smooth flow of whatever material is to be delivered through the pipeline. Removal of the interior flash is also beneficial for ease of movement of equipment such as cleaning pigs which may be run through the pipeline prior to placing it in service. Applicant is aware of the following equipment for removal of internal flash.

U.S. Pat. No. 4,383,786 entitled "Apparatus for Removing Flash from Pipes" discloses a body having V-shaped two-arm levers mounted thereon. Around the periphery of the body there are mounted cutting tool holders with each pivoted to one arm of each of the levers. Rollers which contact the inside surface of the pipe are mounted on the front and rear of the cutting tool holders and cutting tools are rigidly attached to the holders.

U.S. Pat. No. 3,103,834 entitled "Apparatus for Removing Burrs from the Inside of Pipes and the Like" discloses an inner cylinder which acts as a support for a tool carrying outer cylinder. The tool is rotated around its axis during cutting of the burr.

U.S. Pat. No. 2,237,550 entitled "Inside Flash Cutter" discloses a flash cutter supporting frame designed to cut flash along the longitudinal axis of the tube.

SUMMARY OF THE INVENTION

What is provided is an internal flash removal unit which radially cuts the flash while it is still hot and relatively soft. Hydraulic actuators cause arms on which the tool holders and cutting tools are mounted to move toward the cutting position as rotation of the tooling plate on which the arms are mounted begins. The tooling plate is driven by a pinion gear operatively engaged to a gear box and drive motor and rotates approximately 450 degrees while the cutting tools are in the cutting position to insure complete removal of the flash. Shoes on the tool holder make contact with the surface of the pipe and slide along the surface during the cutting procedure to provide a cut consistant with the shape of the pipe. Hydraulic valves control the pressure of the tool holders against the pipe during cutting to insure that the pipe is not scarred. The tool holdlers are provided with backing screws for adjusting the position of the cutting tool therein and the depth of the cut.

In view of the above, it is an object of the invention to provide a flash removal unit which provides a consistent depth of cut.

It is another object of the invention to provide flash removal unit which removes the flash while it is still hot and relatively soft.

BRIEF DESCRIPTION OF THE DRAWINGS

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 1:
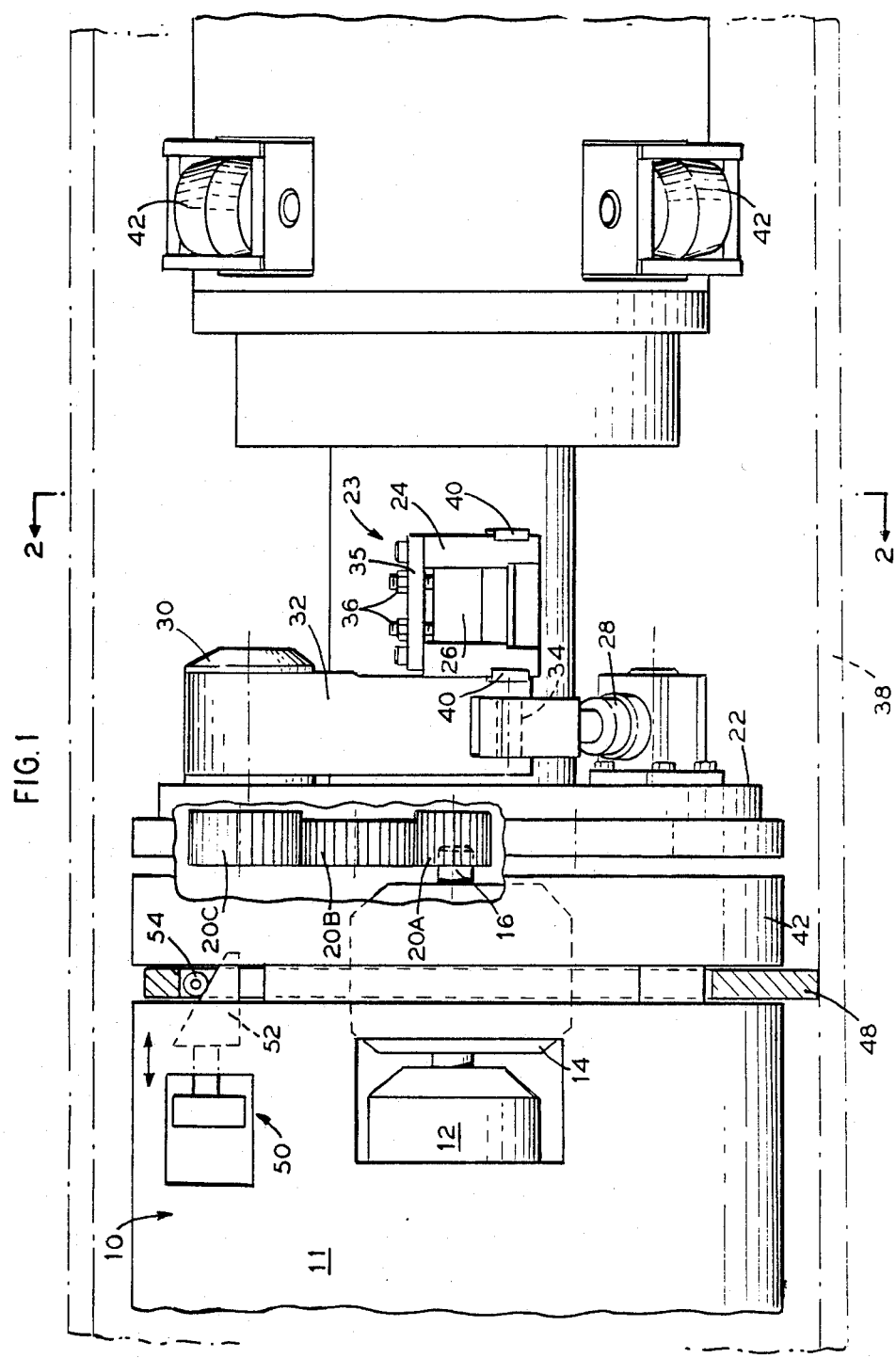
FIG. 1 is a side partial cutaway view of the invention.

Referring to the drawings, it is seen that the invention is generally referred to by the numeral 10. Internal flash removal unit 10 is generally comprised of drive motor 12, gearbox 14, tooling plate 22, and cutting assembly 23.

Drive motor 12 is mounted in housing 11 and is engaged with gearbox 14 so as to drive gearbox 14 when motor 12 is put into operation. In the preferred embodiment, motor 12 is a Reuland twenty horsepower electric motor. Gearbox 14 may be any suitable reduction type of gear but in the preferred embodiment is a gearbox manufactured by Sumitomo. Gearbox 14 has driveshaft 16 extending from one end where it is engaged with means for driving or causing rotation of tooling plate 22.

Tooling plate 22 is rotatably mounted to stationary plate 42 which is attached to housing 11 or may be integral with housing 11. As seen in the cutaway view of FIG. 1, the means for driving tooling plate 22 is comprised of drive gear 20A rigidly attached to and driven by drive shaft 16, idler gear 20B, and gear teeth 20C. Drive gear 20A meshes with idler gear 20B. Although only one is shown in the cutaway view of FIG. 1, three idler gears 20B are provided in the preferred embodiment and substantially evenly spaced around drive gear 20A. Idler gear 20B is held in place by bearing plates not shown on both sides thereof. Idler gear 20B meshes with gear teeth 20C provided on the interior of tooling plate 22. In the preferred embodiment, drive gear 20A has 25 teeth and tooling plate 22 is provided with 67 gear teeth 20C. This provides a gear ratio of 2.68 to 1 from drive gear 20A to tooling plate 22. Thus, at the preferred rotational speed of 14.5 RPM of drive gear 20A, tooling plate 22 will rotate at 5.4 RPM while idler gear 20B will rotate at 17.3 RPM. During rotation, tooling plate 22 drives cutting assembly 23.

Figure 2:
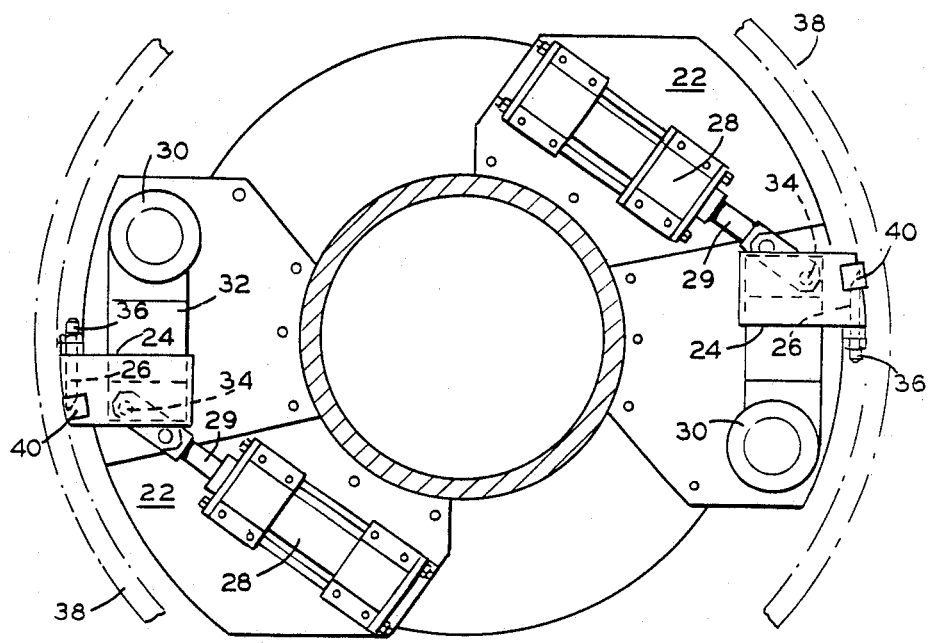
FIG. 2 is a view taken along the lines 2—2 of FIG. 1.
Figure 3:
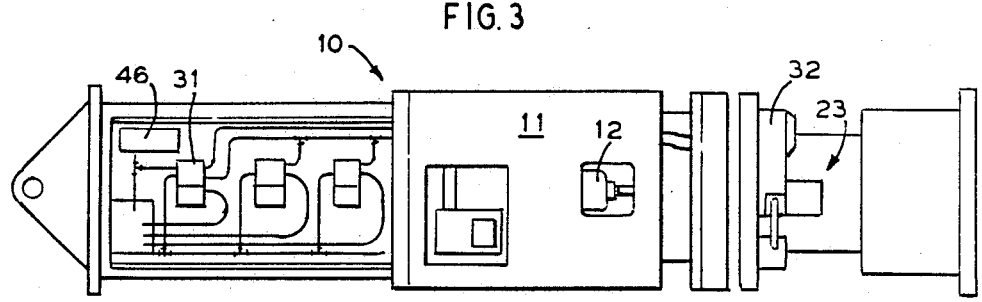
FIG. 3 is an overall side view of the invention.

Cutting assemblies 23 are pivotally attached to tooling plate 22 by means of arms 32 best seen in FIGS. 1 and 2. Arms 32 are pivotally attached at one end thereof to tooling plate 22 by pivotal connection 30. Arms 32 are attached at their other ends to means for actuating movement of arms 32 and cutting assemblies 23 between a first retracted position and a second extended cutting position. In the preferred embodiment, the means for actuating movement of arms 32 is comprised of hydraulic cylinder 28 and piston 29. Hydraulic cylinder 28 is attached at one end to tooling plate 22. Piston 29 extends from the opposite end of cylinder 28 and is pivotally attached at point 34 to arm 32. Hydraulic pressure to cylinder 28 is supplied from a source not shown from a valve 32, seen in FIG. 3, to control the amount of pressure that cutting assembly 23 will exert against pipe 38 during the cutting operation.

As best seen in FIG. 1, each cutting assembly 23 is comprised of tool holder 24 and cutting tool 26. In the preferred embodiment two arms 32 and cutting assemblies 23 are provided. Tool holder 24 is rigidly attached to the end of arm 32 opposite that of pivotal connection 30 and adjacent pivotal connection 34. Tool holder 24 is substsantially U-shaped with the open end facing the interior surface of pipe 38. Cutting tool 26 is rigidly held in place between the two ends of U-shaped tool holder 24 and has its cutting edge facing away from pivotal connection 30. Means for retaining cutting tool 26 in position may comprise slots in the legs of holder 24 adapted to receive cutting tool 26 and one or more bolts threaded through the legs to create a retaining pressure therebetween.

Means for adjusting the cutting position of cutting tool 26 to control the depth of cut is provided in the form of a plate 35 attached across the rear of the legs of tool holder 24. Backing screws 36 threaded through plate 35 extend toward cutting tool 26 and are used to adjust the position of cutting tool 26 within holder 24. To increase the depth of cut, screws 36 are adjusted to move cutting tool 26 farther forward. Conversely, to reduce the depth of cut, screws 36 are adjusted so that cutting tool 26 may be moved backward where the cutting edge extends beyond holder 26 to a lesser extent than when a deeper cut is desired.

Means for reducing the friction between tool holder 24 and pipe 38 during the cutting operation is provided in the form of a carbide sliding shoe 40 attached to each leg of tool holder 24. Shoes 40 contact pipe 38 during the cutting operation to provide for reduced sliding resistance, minimum possibility of damage to pipe 38, and minimum wear to holder 24. Shoes 40 ar also more easily replaced than tool holder 24 when worn.

During operation, immediately after two pipe sections have been welded together, internal flash removal unit 10 is moved into position wherein cutting assemblies 23 are in radial alignment with the weld joint. Two cutting assemblies 23 are provided in the preferred embodiment. Internal flash removal unit 10 is normally attached to the welding equipment used inside of pipe 38 and is easily moved into the proper cutting position. Unit 10 also receives some support for lateral movement inside of pipe 38 by rollers 42. Once moved into position and stabilized by the welding machine to prevent unwanted movement, hydraulic cylinders 28 receive hydraulic fluid pressure through valve 31 from a supply not shown. This causes extension of pistons 29 and pivoting of arms 32 on tooling plate 22. Cutting assemblies 23 are moved from their first retracted position toward a second extended cutting position. At the same time, drive motor 12 is energized which drives gearbox 14. Gearbox 14 serves as a reduction means for motor 12 and causes rotation of drive gear 20A. Drive gear 20A meshes with idler gear 20B, three of which are provided in the preferred embodiment, which meshes with gear teeth 20C on tooling plate 22 to cause rotation thereof. As arms 32 and cutting assemblies 23 rotate with tooling plate 22 and are moved toward the cutting position seen in FIG. 2, cutting tools 26 cut into the flash. Carbide shoes 40 contact pipe 38 at the predetermined pressure provided by valve 31 and slide along the pipe surface as the flash is cut. During the cutting operation, the possibility exists that pipe 38 may be somewhat oval shaped instead of being perfectly rounded. To allow movement of cutting assemblies 23 coinciding with such irregularities, a hydraulic fluid accumulator 46 may be provided. The accumulator 46 may serve to bleed off excess hydraulic fluid due to pressure increases caused on the cutting assemblies 23 at the narrower sections of pipe 38. This serves to maintain an even pressure to prevent scarring of the pipe and provide a consistent cut. After 450 degrees of rotation by tooling plate 22, the hydraulic fluid pressure is reversed and cutting assemblies 23 caused to be moved to their first retracted position. Tooling plate 22 continues rotation until it has completed two full revolutions, 720 degrees. By keeping cutting assemblies 23 in their second extended cutting position for 450 degrees of rotation, the flash should be entirely removed even with the possibility that the cutting edge of one of cutting tools 26 may chip or break and not effectively remove the flash. A scraper 48 or extended plate may also be attached between housing 11 and stationary plate 42 so as to extend downwardly toward pipe 38 and leave only a minimal clearance so that the cut flash is pushed along the interior of pipe 38 with internal flash removal unit 10. Scraper 48 is movably attached between housing 11 and stationary plate 42 and is movable between a first normal extended position, seen in FIG. 1, and a second retracted position. Scraper 48 is moved into its second retracted position by means of hydraulic assembly 50 and wedge 52. Scraper 48 is moved into its retracted position as wedge 52 is driven under roller 54 toward stationary plate 42 and lifts scraper 48. Scraper 48 moves to its extended position due to its own weight when wedge 52 is retracted toward housing 11. This facilitates easy removal of the flash when the machine is removed from the pipeline. Stationary plate 42 may itself also extend downwardly to form a scraper.

Because many varying and differing embodiments may be made within the scope of the inventive concept herein taught and because many modifications may be made in the embodiment herein detailed in accordance with the descripitve requirement of the law, it is to be understood that the details herein are to be interpreted as illustrative and not in a limiting sense.

What is claimed as invention is:

1. An internal flash removal unit for removing hot flash, comprising:
   a. a housing;
   b. a drive motor mounted in said housing;
   c. a gearbox in operative engagement with said drive motor;
   d. a tooling plate rotatably mounted to and coaxially with said housing;
   e. a cutting assembly pivotally mounted to said tooling plate and radially movable between a first retracted position and a second extended cutting position;
   f. a carbide shoe mounted on said cutting assembly;
   g. means between said gearbox and said tooling plate for rotatably driving said tooling plate;
   h. means for moving said cutting assembly between said first and second positions, comprising a hydraulic cylinder and piston connected to said tooling plate and said cutting assembly; and
   i. a hydraulic fluid accumulator mounted in said housing and in fluid communication with said hydraulic cylinder for maintaining even pressure on said cutting assembly while in the cutting position.

2. The flash removal unit of claim 1, further comprising means for adjusting the cutting depth of said cutting assembly.

3. The flash removal unit of claim 1, wherein said drive means comprises:
   a. a drive gear attached to said gearbox;
   b. an idler gear engaged with and driven by said drive gear; and
   c. gear teeth on said tooling plate in engagement with said idler gear.

4. The flash removal unit of claim 1, wherein said cutting assembly comprises:
   a. a U-shaped tool holder; and
   b. a cutting tool removably mounted in said tool holder.

5. The flash removal unit of claim 4, further comprising means for adjusting the position of said cutting tool within said tool holder.

6. An internal flash removal unit for removing hot flash, comprising:
   a. a housing;
   b. a drive motor mounted in said housing;
   c. a gearbox in operative engagement with said drive motor;
   d. a tooling plate rotatably mounted to and coaxially with said housing;
   e. means engaged between said gearbox and said tooling plate for causing rotation of said tooling plate in response to activation of said drive motor;
   f. an arm pivotally mounted on said tooling plate;
   g. a cutting assembly rigidly mounted on said arm;
   h. a carbide shoe mounted on said cutting assembly;
   i. means attached to said tooling plate and said arm for moving said arm and said cutting assembly between a first retracted position and a second extended cutting position, comprising a hydraulic cylinder and piston connected to said tooling plate and said arm; and
   j. a hydraulic fluid accumulator mounted in said housing and in fluid communiciation with said hydraulic cylinder for maintaining even pressure on said cutting assembly while in the cutting position.

7. The flash removal unit of claim 6, further comprising means for adjusting the cutting depth of said cutting assembly.

8. The flash removal unit of claim 6, wherein said means for causing rotation of said tooling plate comprises;
   a. a drive gear attached to said gearbox;
   b. an idler gear engaged with and driven by said drive gear; and
   c. gear teeth on said tooling plate in engagement with said idler gear.

9. The flash removal unit of claim 6, wherein said cutting assembly comprises:
   a. a U-shaped tool holder;
   b. a cutting tool removably mounted in said tool holder.

10. The flash removal unit of claim 9, further comprising means for adjusting the position of said cutting tool within said tool holder.

* * * * *